US010341245B2

(12) United States Patent
Saladi et al.

(10) Patent No.: US 10,341,245 B2
(45) Date of Patent: Jul. 2, 2019

(54) BURSTY DATA TRANSMISSION IN A CONGESTION CONTROLLED NETWORK

(71) Applicant: VMware,Inc., Palo Alto, CA (US)

(72) Inventors: Kalyan Saladi, Sunnyvale, CA (US); Rishi Mehta, San Jose, CA (US)

(73) Assignee: VMWare, Inc., Palo Alto, CA (US)

( * ) Notice: Subject to any disclaimer, the term of this patent is extended or adjusted under 35 U.S.C. 154(b) by 235 days.

(21) Appl. No.: 14/223,754

(22) Filed: Mar. 24, 2014

(65) Prior Publication Data
US 2015/0271073 A1 Sep. 24, 2015

(51) Int. Cl.
*H04L 12/801* (2013.01)
*H04L 12/825* (2013.01)
*H04L 12/841* (2013.01)

(52) U.S. Cl.
CPC ............ *H04L 47/283* (2013.01); *H04L 47/37* (2013.01)

(58) Field of Classification Search
CPC ......... H04L 16/16; H04L 41/14; H04L 43/00; H04L 43/026; H04L 47/10; H04L 47/12; H04L 47/37; H04W 24/06; H04W 24/08
See application file for complete search history.

(56) References Cited

U.S. PATENT DOCUMENTS

| | | | | |
|---|---|---|---|---|
| 5,193,151 A * | 3/1993 | Jain | ..................... | H04L 47/10 370/230 |
| 5,452,297 A * | 9/1995 | Hiller | ..................... | H04L 12/64 370/395.61 |
| 5,764,626 A * | 6/1998 | VanDervort | ............... | H04J 3/14 370/232 |
| 6,201,791 B1 * | 3/2001 | Bournas | ................... | H04L 43/50 370/234 |
| 6,594,241 B1 * | 7/2003 | Malmlof | ............... | H04W 28/18 370/329 |
| 6,643,259 B1 * | 11/2003 | Borella | .................... | H04L 47/10 370/231 |
| 6,754,177 B1 * | 6/2004 | Gersht | ................. | H04L 12/5601 370/230 |
| 6,757,248 B1 * | 6/2004 | Li | ......................... | H04L 1/1858 370/235 |
| 6,891,852 B1 * | 5/2005 | Cloutier | .............. | H04W 76/045 370/345 |
| 7,046,631 B1 * | 5/2006 | Giroux | ................ | H04L 12/5601 370/234 |
| 7,180,858 B1 * | 2/2007 | Roy | .................... | H04L 12/2697 370/229 |

(Continued)

*Primary Examiner* — Jeffrey M Rutkowski
*Assistant Examiner* — Jonathan Wood

(57) ABSTRACT

In a computer-implemented method for reducing delay of bursty data transmission in a network employing a congestion control protocol, data is accessed that is to be periodically transmitted over a network employing a congestion control protocol. The data is to be periodically transmitted with a high burst rate followed by an idle period. The congestion control protocol progressively increases a data transmission rate during a data transmission rate increase period invoked immediately following a predetermined idle period. Prior to transmitting the data, priming data is transmitted during at least a portion of the idle period until the congestion control protocol progressively increases the data transmission rate to a desired transmission rate. The data is transmitted at the desired transmission rate.

24 Claims, 6 Drawing Sheets

(56) References Cited

U.S. PATENT DOCUMENTS

| | | | | |
|---|---|---|---|---|
| 7,240,364 B1* | 7/2007 | Branscomb | H04L 29/12113 | 726/5 |
| 7,596,090 B2* | 9/2009 | Black | H04B 7/264 | 370/234 |
| 7,672,239 B1* | 3/2010 | Tripathi | H04L 49/00 | 370/235 |
| 7,707,185 B1* | 4/2010 | Czezatke | G06F 9/45504 | 707/649 |
| 7,765,307 B1* | 7/2010 | Kritov | H04L 69/14 | 709/227 |
| 7,881,200 B2* | 2/2011 | Lee | H04L 1/0002 | 370/235 |
| 8,112,397 B2* | 2/2012 | Gilpin | G06F 11/1464 | 707/610 |
| 8,200,771 B2* | 6/2012 | Ganesh | G06F 9/4856 | 709/212 |
| 8,494,539 B1* | 7/2013 | Surazski | H04L 47/10 | 370/338 |
| 8,782,008 B1* | 7/2014 | Xing | G06F 17/30575 | 707/660 |
| 8,819,309 B1* | 8/2014 | Bruce | G06F 13/385 | 710/11 |
| 8,942,119 B1* | 1/2015 | Vivanco | H04W 24/08 | 370/252 |
| 9,104,331 B2* | 8/2015 | Hsu | G06F 11/1438 | |
| 9,690,662 B2* | 6/2017 | McNeeney | G06F 11/1482 | |
| 9,699,103 B2* | 7/2017 | Tzhori | H04L 47/37 | |
| 9,703,584 B2* | 7/2017 | Kottomtharayil | G06F 9/505 | |
| 9,864,620 B2* | 1/2018 | Barabash | G06F 9/45558 | |
| 2001/0049740 A1* | 12/2001 | Karpoff | H04L 12/5601 | 709/231 |
| 2002/0048280 A1* | 4/2002 | Lee | H04L 47/10 | 370/468 |
| 2002/0120768 A1* | 8/2002 | Kirby | H04L 47/11 | 709/235 |
| 2002/0156910 A1* | 10/2002 | Senda | H04L 47/10 | 709/232 |
| 2003/0099243 A1* | 5/2003 | Oh | H04Q 11/0066 | 370/395.21 |
| 2003/0103243 A1* | 6/2003 | Watanabe | H04N 21/2381 | 358/405 |
| 2004/0062201 A1* | 4/2004 | Deshpande | H04L 47/10 | 370/235 |
| 2005/0041635 A1* | 2/2005 | Chung | H04L 47/10 | 370/351 |
| 2005/0058131 A1* | 3/2005 | Samuels | H04L 12/24 | 370/389 |
| 2005/0083936 A1* | 4/2005 | Ma | H04L 45/04 | 370/392 |
| 2005/0135248 A1* | 6/2005 | Ahuja | H04L 47/10 | 370/235 |
| 2005/0141419 A1* | 6/2005 | Bergamasco | H04L 12/66 | 370/230 |
| 2005/0259577 A1* | 11/2005 | Sin | H04L 1/188 | 370/229 |
| 2006/0045011 A1* | 3/2006 | Aghvami | H04L 47/10 | 370/230 |
| 2006/0092840 A1* | 5/2006 | Kwan | H04L 47/10 | 370/230.1 |
| 2006/0184664 A1* | 8/2006 | Jung | H04L 47/10 | 709/224 |
| 2006/0193295 A1* | 8/2006 | White | H04L 12/5692 | 370/336 |
| 2007/0008884 A1* | 1/2007 | Tang | H04L 29/06 | 370/230 |
| 2007/0115814 A1* | 5/2007 | Gerla | H04L 1/0002 | 370/230 |
| 2007/0165524 A1* | 7/2007 | Mascolo | H04L 69/163 | 370/230 |
| 2007/0165531 A1* | 7/2007 | Labrador | H04L 47/10 | 370/235 |
| 2007/0185643 A1* | 8/2007 | Yamane | G01C 21/34 | 701/117 |
| 2007/0214340 A1* | 9/2007 | Leveille | G06F 9/52 | 711/203 |
| 2007/0255865 A1* | 11/2007 | Gaither | G06F 9/5077 | 710/36 |
| 2007/0280107 A1* | 12/2007 | Ludwig | H04L 1/0002 | 370/230 |
| 2008/0219164 A1* | 9/2008 | Shimonishi | H04L 41/0896 | 370/235 |
| 2009/0116381 A1* | 5/2009 | Kanda | H04L 47/10 | 370/229 |
| 2010/0061251 A1* | 3/2010 | Nassor | H03M 13/353 | 370/242 |
| 2010/0095133 A1* | 4/2010 | Peter | G06F 7/00 | 713/189 |
| 2010/0120455 A1* | 5/2010 | Aghili | H04L 12/5895 | 455/466 |
| 2010/0124180 A1* | 5/2010 | Benkis | H04L 12/2602 | 370/252 |
| 2010/0158032 A1* | 6/2010 | Carlsson | H04L 47/10 | 370/412 |
| 2010/0246398 A1* | 9/2010 | Chiang | H04L 43/0829 | 370/235 |
| 2011/0007790 A1* | 1/2011 | Xu | H04L 1/0001 | 375/225 |
| 2011/0096665 A1* | 4/2011 | McCann | H04L 47/10 | 370/235 |
| 2011/0149730 A1* | 6/2011 | Nemeth | H04L 43/0864 | 370/234 |
| 2011/0167196 A1* | 7/2011 | Scales | G06F 11/1438 | 711/6 |
| 2011/0211449 A1* | 9/2011 | Attar | H04L 47/34 | 370/235 |
| 2011/0235519 A1* | 9/2011 | Racz | H04L 47/11 | 370/238 |
| 2011/0255403 A1* | 10/2011 | Papirakis | H04L 47/25 | 370/230.1 |
| 2011/0317556 A1* | 12/2011 | Hiehata | H04L 47/11 | 370/230.1 |
| 2012/0057511 A1* | 3/2012 | Sivakumar | H04W 28/06 | 370/310 |
| 2012/0099430 A1* | 4/2012 | Vos | H04W 28/02 | 370/235 |
| 2012/0106329 A1* | 5/2012 | Ahmed | H04W 4/005 | 370/230 |
| 2012/0163175 A1* | 6/2012 | Gupta | H04L 47/10 | 370/235 |
| 2012/0236718 A1* | 9/2012 | Noureddin | H04L 47/12 | 370/235 |
| 2013/0007100 A1* | 1/2013 | Trahan | H04L 67/02 | 709/203 |
| 2013/0051225 A1* | 2/2013 | Pullen | H04L 12/2801 | 370/230 |
| 2013/0097120 A1* | 4/2013 | Mummidi | G06F 17/30289 | 707/649 |
| 2013/0114408 A1* | 5/2013 | Sastry | H04W 28/02 | 370/231 |
| 2013/0121147 A1* | 5/2013 | Tapia | H04W 28/0289 | 370/230 |
| 2013/0322246 A1* | 12/2013 | Zhou | H04L 47/11 | 370/235 |
| 2013/0336136 A1* | 12/2013 | Meylan | H04L 43/08 | 370/252 |
| 2014/0006608 A1* | 1/2014 | Silvola | H04L 43/16 | 709/224 |
| 2014/0059392 A1* | 2/2014 | Ren | G06F 11/301 | 714/47.1 |
| 2014/0071290 A1* | 3/2014 | Collen | H04N 9/79 | 348/159 |
| 2014/0112405 A1* | 4/2014 | Jafarian | H04B 7/0413 | 375/267 |
| 2014/0115186 A1* | 4/2014 | Weston | H04L 69/163 | 709/235 |
| 2014/0136853 A1* | 5/2014 | Fukuda | H04L 63/0428 | 713/189 |

(56) References Cited

U.S. PATENT DOCUMENTS

| | | | |
|---|---|---|---|
| 2014/0211682 A1* | 7/2014 | Huang | H04W 4/06 370/312 |
| 2014/0269326 A1* | 9/2014 | Westin | H04L 47/10 370/237 |
| 2014/0269380 A1* | 9/2014 | Rusak | H04L 43/0811 370/252 |
| 2014/0269401 A1* | 9/2014 | Gondi | H04L 43/0876 370/253 |
| 2014/0282811 A1* | 9/2014 | Lohmar | H04N 21/64738 725/146 |
| 2014/0286164 A1* | 9/2014 | Mahindra | H04L 47/19 370/235 |
| 2014/0301197 A1* | 10/2014 | Birke | H04L 47/52 370/235 |
| 2014/0304425 A1* | 10/2014 | Taneja | H04L 47/12 709/235 |
| 2015/0003245 A1* | 1/2015 | Pressley | H04L 47/27 370/232 |
| 2015/0029853 A1* | 1/2015 | Raindel | H04L 47/127 370/235 |
| 2015/0029887 A1* | 1/2015 | Briscoe | H04L 47/326 370/252 |
| 2015/0040121 A1* | 2/2015 | Barabash | G06F 9/45558 718/1 |
| 2015/0085648 A1* | 3/2015 | Leith | H04L 47/12 370/230 |
| 2015/0103663 A1* | 4/2015 | Amini | H04W 28/0215 370/235 |
| 2015/0117206 A1* | 4/2015 | Radulescu | H04L 43/10 370/235 |
| 2015/0124604 A1* | 5/2015 | Dao | H04W 28/0247 370/231 |
| 2015/0134612 A1* | 5/2015 | Silberstein | G06F 17/30575 707/634 |
| 2015/0142958 A1* | 5/2015 | Tamura | H04L 67/1008 709/224 |
| 2015/0180722 A1* | 6/2015 | Kapadia | H04L 41/12 370/401 |
| 2015/0188830 A1* | 7/2015 | Zhao | H04L 47/27 370/235 |

\* cited by examiner

300

State data of a primary virtual machine is accumulated for subsequent transmission to a secondary virtual machine over a Transmission Control Protocol and Internet Protocol (TCP/IP) network employing a Slow-Start Threshold (SST) congestion control protocol. When invoked, the SST congestion control protocol progressively increases a data transmission rate during a data transmission rate increase period invoked immediately following a predetermined idle period
310

Prior to transmitting the state data at a check point, priming data is transmitted during at least a portion of the idle period until the congestion control protocol progressively increases the data transmission rate to a desired transmission rate such that the state data is transmitted in low-latency bursty fashion
320

In response to data transmission rate reaching a value, the state data is transmitted over the network in a low-latency bursty fashion
330

In response to completion of the data transmission rate increase period where the congestion window increases to its default value, the state data is transmitted
340

The state data of the primary virtual machine is transmitted to a secondary virtual machine
350

The state data of a primary virtual machine is periodically accumulated
360

State data of a primary virtual machine is accumulated for subsequent transmission to a secondary virtual machine over a Transmission Control Protocol and Internet Protocol (TCP/IP) network employing a Slow-Start Threshold (SST) congestion control protocol. When invoked, the SST congestion control protocol automatically decreases a congestion window, wherein the data transmission rate progressively increases as the congestion window progressively increases in response to acknowledgements of transmitted data within the congestion window
410

↓

Prior to transmitting the state data at a check point, priming data is transmitted during at least a portion of the idle period until the congestion window progressively increases. As a result, the data transmission rate progressively increases such that the state data is transmitted in low-latency bursty fashion
420

↓

Periodically transmit the state data to a secondary virtual machine over the network at a desired transmission rate such that the state data is transmitted in low-latency bursty fashion
430

State data of the primary virtual machine is accumulated in dirty pages for subsequent transmission over the Transmission Control Protocol and Internet Protocol (TCP/IP) network that includes a congestion control protocol. Transmission of the state data is preceded by an idle period and transmitted with a low-latency high burst rate over the network. Moreover, the congestion control protocol, when invoked, may limit the transmission rate over the network
510

↓

It is determined whether or not the period to accumulate the state data will exceed the predetermined idle period of the congestion control algorithm
520

↓

Priming data is transmitted over the TCP/IP network during at least a portion of the predetermined idle period which prevents the congestion window from reducing and the transmission rate not settling to a reduced value
530

↓

State data is transmitted in a low-latency bursty fashion over the TCP/IP network because the transmission rate of the TCP/IP network was prevented from settling to a reduced value
540

FIG. 5

BURSTY DATA TRANSMISSION IN A CONGESTION CONTROLLED NETWORK

BACKGROUND

Network connections are referred to as bursty when they experience brief periods of high throughput interspersed with periods of idleness or quiescence, i.e., having little or no data flow. Transmission Control Protocol (TCP) network congestion control algorithms are commonly used to limit packet loss when the network becomes congested. Some such algorithms respond to a burst of network traffic over a particular connection by gradually ramping up a congestion window size which represents the number unacknowledged packets in flight at a particular time. Unfortunately, such network congestion control algorithms impair the throughput of bursty networks because the window size will reset to a low value, e.g., to one, after the connection is idle or quiescent for a period of time.

For some applications that generate bursty network flows, high throughput and low latency are critical. An example of such an application is checkpoint based fault tolerance. In this application, a primary virtual machine maintains gathers state data and periodically transmits the state data to a secondary virtual machine, e.g., at intervals on the order of tens of milliseconds. While waiting for acknowledgement of the state data, the primary virtual machine may suspend execution of its workload. Upon acknowledgement of receipt by the secondary virtual machine of the state date, the primary virtual machine may resume execution. Accordingly, any delay in transmitting the state data and receiving acknowledgement thereof negatively impacts the performance of the primary virtual machine and/or the transmission rate of state data.

BRIEF SUMMARY OF EMBODIMENTS

It should be appreciated that embodiments of the present invention can be implemented in numerous ways, including as a process, an apparatus, a system, a device, a method, a computer-implemented method, or a non-transitory computer-readable storage medium.

In one embodiment, a computer-implemented method for reducing delay of bursty data transmission in a network employing a congestion control protocol is provided. The computer-implemented method includes, accessing data to be periodically transmitted over a network employing a congestion control protocol. The data is to be periodically transmitted with a high burst rate followed by an idle period. The congestion control protocol progressively increases a data transmission rate during a data transmission rate increase period invoked immediately following a predetermined idle period. Prior to transmitting the data, priming data is transmitted during at least a portion of the idle period until the congestion control protocol progressively increases the data transmission rate to a desired transmission rate. The data is transmitted at the desired transmission rate.

In another embodiment, a non-transitory computer-readable storage medium having instructions embodied therein is provided that when executed cause a computer system to perform a method for reducing delay of bursty transmission in a network employing a congestion control protocol. The method includes accessing state data of a primary virtual machine to be periodically transmitted over a network employing a congestion control protocol, wherein the congestion control protocol progressively increases data transmission rates during a data transmission rate increase period invoked immediately following a predetermined idle period, wherein the state data is to be periodically transmitted with a high burst rate followed by an idle period. Also, prior to transmitting the state data of said primary virtual machine over the network, transmitting priming data during at least a portion of the idle period until said congestion control protocol progressively increases the data transmission rate to a desired transmission rate. The method also includes periodically transmitting the state data to a secondary virtual machine over the network at the desired transmission rate.

The advantages of the present invention will become apparent from the following detailed description, taken in conjunction with the accompanying drawings, illustrating by way of example the principles of the invention.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description of the drawings should not be understood as being drawn to scale unless specifically noted.

FIG. 3 depicts a flow diagram for a method for reducing delay of bursty data transmission in a network employing a congestion control protocol, according to various embodiments.

FIG. 4 depicts a flow diagram for a method for reducing delay of bursty data transmission in a network employing a congestion control protocol, according to various embodiments.

FIG. 5 depicts a flow diagram for a method for preventing settling of a transmission rate to a reduced value, according to various embodiments.

DESCRIPTION OF EMBODIMENTS

Figure 1:
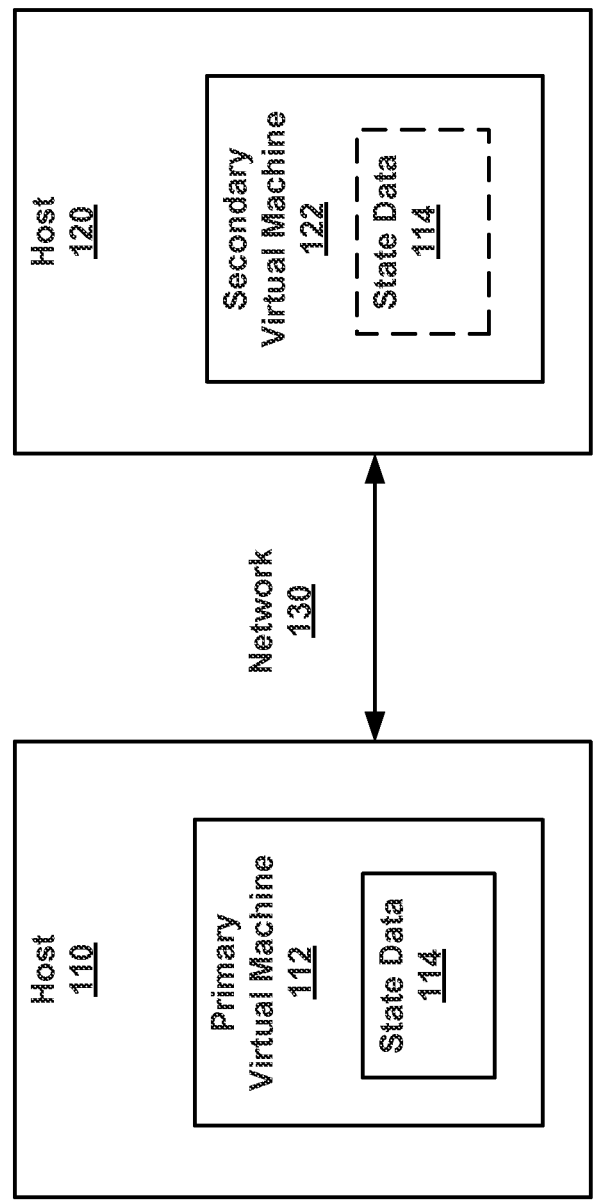
FIG. 1 is a block diagram that illustrates an embodiment of a virtual computing environment.

Reference will now be made in detail to various embodiments, examples of which are illustrated in the accompanying drawings. While various embodiments are discussed herein, it will be understood that they are not intended to be limiting. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding. However, embodiments may be practiced without one or more of these specific details. In other instances, well known methods, procedures, components, and circuits have not been described in detail as not to unnecessarily obscure aspects of the described embodiments.

Brief Overview of Embodiments

As described above, the primary virtual machine periodically sends state data to a secondary virtual machine. Once the primary virtual machine transmits the state data over the TCP/IP network, the primary virtual machine does not execute its current work load until it receives acknowledgement from secondary machine. As a result, there is a lag in execution that negatively affects the work load of the primary virtual machine. The periodic intervals of sending the state data may be regular intervals or irregular intervals.

There are conflicting interests as to when to send the state data. First, it is desirable to wait as long as possible to send the state data from the primary virtual machine such that the primary virtual machine is not required to halt execution. Second, it is also desirable to not wait too long to transmit state data because if there is a failure in the primary virtual machine, then the state data that occurs prior to transmission to the secondary virtual machine (and after the previous transmission) is lost. Therefore, to balance the conflicting interests, the state data is periodically transmitted, for example in the range of 5-500 milliseconds (ms), in a low-latency bursty fashion to the secondary virtual machine.

As will be described in further detail herein, the periodic transmission of the state data may or may not automatically reduce the congestion window defined by the congestion control algorithm.

In one embodiment, state data is periodically transmitted at irregular intervals. For example, state data is sent when the amount of state data reaches a predetermined threshold or size (e.g., 32 megabytes). In one interval, it may take 5 ms to accumulate the predetermined amount of state data and subsequently send the state data. While in another interval, it may take 100 ms to accumulate the predetermined amount of data and subsequently send the state data.

Priming data is injected into the transmission stream prior to transmission of the state data to either open up the congestion window or to prevent the congestion window from closing. In other words, prior to the transmission of the state data, it is determined or predicted if and when priming data is transmitted into the data stream such that the congestion window progressively opens or to prevent the congestion window from closing. As a result, the state data is transmitted in a low-latency bursty fashion, as will be described in further detail herein.

More specifically, the priming data is injected or transmitted when it is determined or predicted that the idle period between the transmission of state data exceeds the pre-determined idle period. For example, if the pre-determined idle period is 10 ms and the idle period between the transmission of state data exceeds 10 ms, then the priming data is injected into the data stream prior to transmission of the state data. However, if the pre-determined idle period as 10 ms and the idle period between the transmission of state data is less than 10 ms, then the priming data is not injected into the data stream prior to transmission of the state data.

The amount of priming data injected into the data stream increases as the congestion window increases. Consider an example where the congestion window is set at a default size associated with a first transmission rate (e.g., R1). Once it is determined that the idle period between the transmission of state data exceeds the pre-determined idle period, the congestion window is automatically reduced to a lower second transmission rate (e.g., R0). It should be appreciated that the second transmission rate may or may not be 0.

The congestion window progressively increases as data is transmitted and an acknowledgement is received. As a result, the transmission rate progressively increases from R0 to R1 as the congestion window progressively increases. For example, when the congestion window is at R0, a first packet of priming data is transmitted. Once an acknowledgement is received, then two packets of priming data are transmitted. Once an acknowledgment is received, then four packets of priming data are transmitted, and so on, until the congestion window increases to its default value of R1. The priming data is sent until the transmission rate of the network is at a desirable rate at which to send the state data in a low-latency bursty fashion. It should be appreciated that the low-latency bursty data may be transmitted while the congestion window is progressively increasing (e.g., prior to R1) or may be transmitted once the congestion window is at its default value (e.g., R1).

Example Embodiments of a Virtual Computing Environment

FIG. 1 depicts an embodiment of virtual computing environment (VCE) 100 (or virtualization infrastructure).

Each virtual machine in VCE 100 may include a guest operating system and a guest file system. The virtual machines may be logically grouped. That is, a subset of virtual machines may be grouped together in a container (e.g., VMware vApp™). For example, three different virtual machines may be implemented for a particular workload. As such, the three different virtual machines are logically grouped together to facilitate in supporting the workload. The virtual machines in the logical group may execute instructions alone and/or in combination (e.g., distributed) with one another. Also, the container of virtual machines and/or individual virtual machines may be controlled by a virtual management system. The virtualization infrastructure may also include a plurality of virtual datacenters. In general, a virtual datacenter is an abstract pool of resources (e.g., memory, CPU, storage). It is understood that a virtual data center is implemented on one or some combination of physical machines.

As will be described in further detail herein, the virtual machines are hosted by a host computing system. A host includes virtualization software that is installed on top of the hardware platform and supports a virtual machine execution space within which one or more virtual machines may be concurrently instantiated and executed.

In some embodiments, the virtualization software may be a hypervisor (e.g., vSphere® Hypervisor).

Additionally, a hypervisor or virtual machine monitor (VMM) is a piece of computer software, firmware or hardware that creates and runs virtual machines. A computer on which a hypervisor is running one or more virtual machines is defined as a host machine. Each virtual machine is called a guest machine. The hypervisor presents the guest operating systems with a virtual operating platform and manages the execution of the guest operating systems.

During use, the virtual machines perform various workloads. For example, the virtual machines perform the workloads based on executing various applications. The virtual machines can perform various workloads separately and/or in combination with one another.

VCE 100 includes host 110 and host 120. Host 110 includes primary virtual machine 112 and host 120 includes secondary virtual machine 122.

It should be appreciated that host 110 can include any number of virtual machines and host 120 can include any number of virtual machines. However, for the sake of clarity and brevity, the discussion herein will focus on primary virtual machine 112 and secondary virtual machine 122.

VCE 100 is a checkpoint based fault-tolerant system. In one embodiment, primary virtual machine 112 is a checkpoint based fault-tolerant virtual machine. In general, fault-tolerant describes a computer system or component designed so that, in the event that a component fails, a backup component or procedure can immediately take its place with very little or no loss of service.

Accordingly, primary virtual machine 112 is a virtual machine that is designed such that, if it fails, a backup virtual machine (e.g., secondary virtual machine 122) can immediately take its place with little or no loss of service.

State data 114 of primary virtual machine 112 is periodically transmitted over network 130 to host 120 such that if primary virtual machine 112 fails, then secondary virtual machine 122 can immediately take the place of primary virtual machine by utilizing state data 114 of primary virtual machine 112.

In one embodiment, during each check point, as defined by a fault-tolerant protocol, the state data is accumulated and stored as dirty pages. A page cache (or disk cache) is a "transparent" cache of disk-backed pages kept in main memory (RAM) by the operating system for quicker access. A page cache is implemented in kernels with the paging memory management. Pages that have been modified in memory for writing to the disk are marked "dirty" and have to be flushed to the disk before they can be freed.

The fault-tolerant protocol can be any fault tolerant protocol that enables secondary virtual machine 122 to immediately take the place of a failed primary virtual machine 112. In one embodiment, the fault tolerant protocol is a multiprocessing systems fault tolerance (SMP-FT) protocol.

As described above, state data 114 of primary machine is transmitted over network 130 to host 120. In various embodiments, state data 114 is transmitted at a high burst rate over network 130 and/or periodically over network 130.

In one embodiment, network 130 is a TCP/IP network. Additionally, in another embodiment, network 130 also employs a congestion control algorithm. In general, congestion control algorithms control data traffic in a network, so as to avoid congestive collapse by attempting to avoid oversubscription of any of the processing or link capabilities of the intermediate nodes and networks and taking resource reducing steps, such as reducing the rate of sending packets.

In one embodiment, network 130 employs a Slow-Start Threshold (SST) congestion control protocol. An SST congestion protocol avoids sending more data than the network is capable of transmitting in order to avoid network congestion.

State data 114 is any data associated with the primary virtual machine 112 that enables a secondary virtual machine to immediately take the place of primary virtual machine. The state data includes key aspects of the primary virtual machine. The state data can include, but is not limited to, write state, network state, and memory state of the primary virtual machine.

When state data 114 is transmitted over network 130 to secondary virtual machine 122, primary virtual machine 112 pauses execution until primary virtual machine 112 receives an acknowledgement of the receipt of state data 114 from secondary virtual machine 122. Upon the acknowledgment of receipt from secondary virtual machine 122, primary virtual machine 112 resumes execution (e.g., release network packets to the clients/other systems). Therefore, the time to transmit the state data (e.g., checkpoint data or traffic) and the time to receive the acknowledgement from the secondary virtual machine directly impacts the execution of the workload on the primary virtual machine.

As will be described in further detail below, the state data is transmitted during a periodic interval. In particular, the state data is transmitted as low-latency bursty data during a fraction of the periodic interval and immediately followed by an idle period. In various embodiments, the state data is 1000 units of packets, wherein one packet is 1400 bytes. In other embodiments the state data may be other units of packets and/or packets may include a different number of bytes.

Examples of Data Periodically Transmitted Over a Network

Figure 2A:
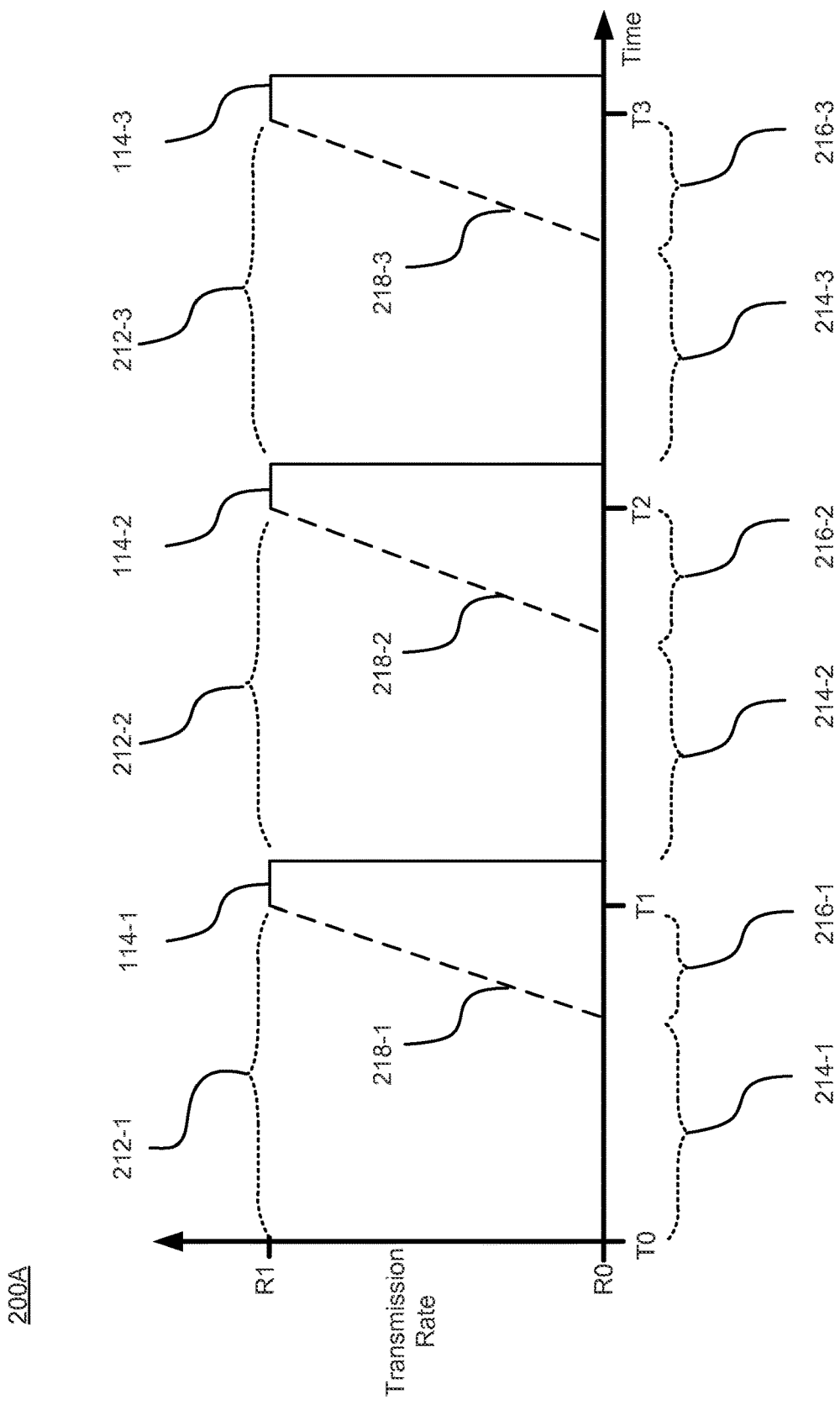
FIG. 2A is a graph illustrating periodically transmitted state data, according to various embodiments.

FIG. 2A depicts graph 200A illustrating an embodiment where the state data is periodically transmitted over network 130.

As depicted, state data 114 (or 114-1, 114-2, 114-3 and so on) is transmitted periodically at times T1, T2 and T3, respectively, immediately following an idle period 212. That is, there is an idle period 212-1 (no transmission of state data) prior to transmission of state data 114-1, an idle period 212-2 prior to transmission of state data 114-2 and idle period 212-3 prior to transmission of state data 114-3. It is noted that, in FIG. 2A, the state data is depicted as a solid line.

In various embodiments, the transmission period of the state data (or the idle period) may be in the range of 5-500 milliseconds (ms).

Depending on the type of network protocol and congestion control algorithm that the network may employ, the periodic and bursty transmission of the state data may negatively affect the transmission rate of the state data. In particular, the idle period may result in reducing the congestion window to an initial default value. Although the congestion window ramps up with transmission and acknowledgements, a performance penalty is paid during each transmission of state data.

The congestion window is a sender imposed window that is implemented to avoid overrunning components (e.g., routers) in the middle of the network path. The sender, with each segment sent, increases the congestion window slightly, i.e., the sender will allow itself more outstanding sent data. But if the sender detects packet loss, it will reduce the congestion window.

According to the congestion control algorithm (e.g., SST), the congestion window size may automatically be reduced if the network link is idle for predetermined duration. The pre-determined duration may be the duration of a certain number of round trip times (RTTs). An RTT is the duration from a packet sent out by the sender and an acknowledgement is received by the sender that the packet was received. In one embodiment, the predetermined duration is three RTTs. For example, if a predetermined idle period (e.g., predetermined idle periods 214-1, 214-2, 214-3) are more than three RTTs, then the congestion window is reduced from an initial size at a first transmission rate (e.g., R1), to a lower size at lower transmission rate (e.g., R0). As the congestion window progressively increases the transmission rates progressively increase during a transmission rate increase period (e.g., transmission rate increase periods 216-1, 216-2, and 216-3).

The transmission rate increase period increases (e.g., from R0 to R1) based on received acknowledgements by the sender, until the congestion window increases to its original default size.

In some conventional systems, the idle period between transmissions may imply that the SST algorithm does not know enough about recent transmissions. As a result, the SST algorithm makes a conservative approach to data transmission and the congestion window is reduced.

Therefore, it is desirable to transmit the state data at a desired transmission rate (e.g., R1) rather than a lower transmission rate during the transmission rate increase period due to a reduced congestion window. As a result, the state data is enabled to be transmitted in a low-latency bursty fashion rather than a high-latency non-bursty fashion during the transmission rate increase period.

In order to transmit the state data in a low-latency bursty fashion (when the idle period between transmission of state data is longer than a pre-determined idle period set forth by the congestion control algorithm), priming data is transmitted prior to transmitting the state data. For example, it is determined or predicted that idle period 212-1 exceeds pre-determined idle period 214-1. In response, the congestion window is reduced from its initial value (e.g., from R1 to R0). Priming data is then transmitted during the transmission rate increase period (e.g., the period of increase from some lower level such as R1 upward to R1) while the congestion window progressively increases. In particular, priming data 218-1 is transmitted during transmission rate increase period 218-1 (prior to transmission of state data 114-1), priming data 218-2 is transmitted during transmission rate increase period 216-2 (prior to transmission of state data 114-2), and priming data 218-3 is transmitted during transmission rate increase period 216-3 (prior to transmission of state data 114-3).

In doing so, the state data is transmitted in a low-latency bursty fashion at a high transmission rate (e.g., R1) instead of being transmitted at a low transmission rate (e.g., less than R1) and non-bursty fashion during the transmission rate increase period.

Priming data is any data that is transmitted in a transmission rate increase period prior to transmission of the state data. In one embodiment, the priming data originates from primary virtual machine 112. However, the priming data is not required to originate from the primary virtual machine. For example, the priming data could be incorporated into any network management layer. The network management layer could access or learn the transmission pattern and automatically perform the window enlargement.

The transmission of the priming data and the state data, in one embodiment, results in a trapezoidal pattern due to the SST's ramp up, as depicted in FIG. 2A. It is noted that the state data could be transmitted in a low-latency bursty fashion as a square wave over network when the congestion window is not reduced.

It is also noted that if the idle period (e.g., 212-1) prior to sending the state data, is less than the predetermined idle period (e.g., 214-1), then priming data is not required to be sent. The congestion control window is not reduced and the state data is periodically transmitted without reduction in transmission rate—for example the state data is transmitted as a square wave.

In various embodiments, the state data is transmitted at various intervals or non-periodically. As such, if the interval is shorter than the predetermined idle period (e.g., a predetermined number of RTTs), then priming data is not required to be sent. However, if the interval is longer than the predetermined idle period, then priming data is transmitted prior to the transmission of state data, as described above.

In various embodiments, priming data is any data that is transmitted such that the state data is not required to be transmitted during the transmission rate increase period.

Figure 2B:
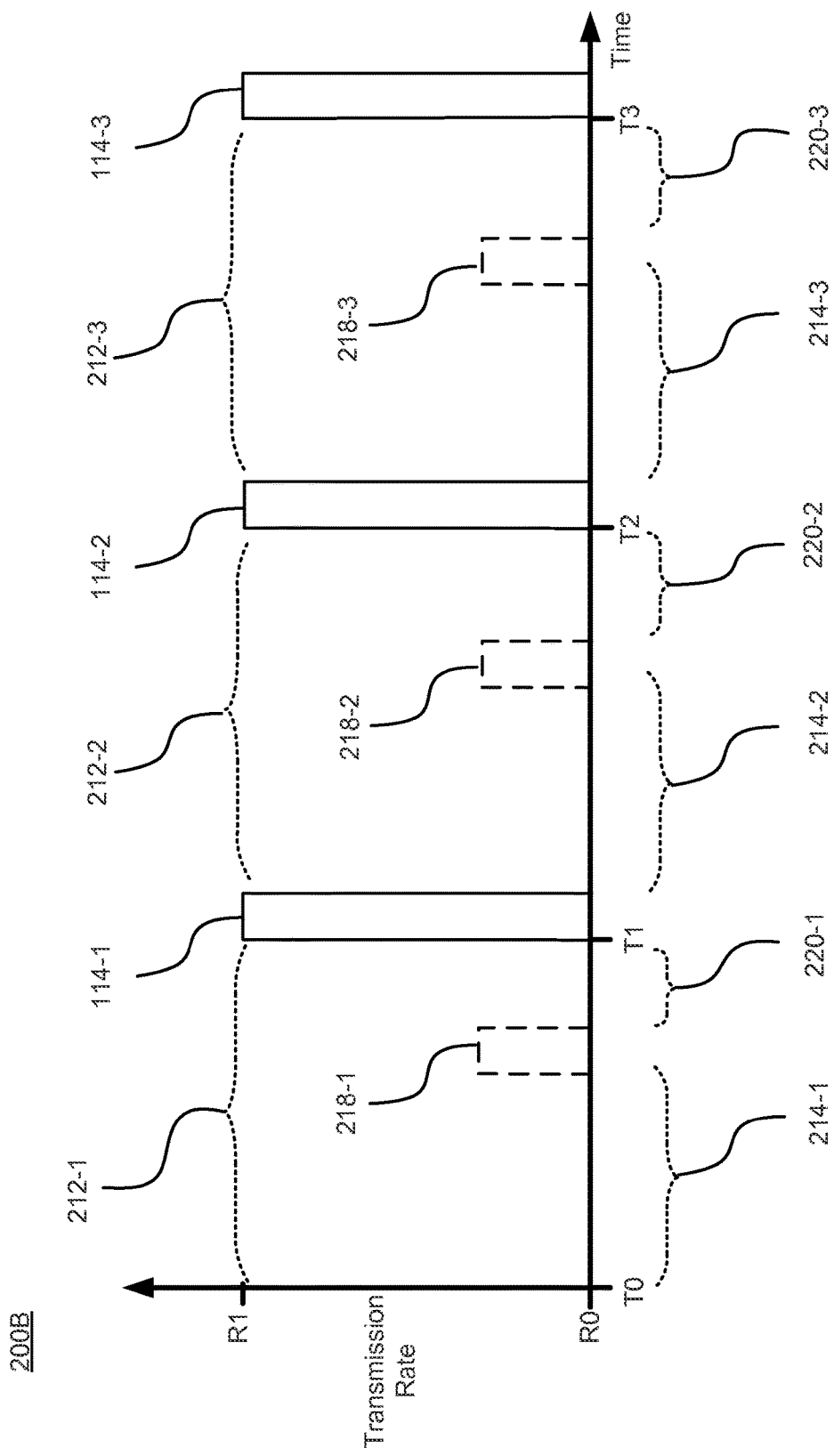
FIG. 2B is a graph illustrating periodically transmitted state data, according to various embodiments.

FIG. 2B depicts graph 200B illustrating an embodiment where the state is data periodically transmitted over network 130 such that the transmission rate is prevented from settling to a lower value.

In general, priming data (e.g., 218-1) is transmitted during at least a portion of the predetermined idle period (e.g., 214-1). In doing so, the congestion window is not reduced and the transmission rate increase period is not invoked. As a result, the subsequently transmitted state data (e.g., 114-1) is transmitted in a low-latency bursty fashion at an optimal transmission rate (e.g., R1).

State data 114 of primary virtual machine 112 is accumulated for subsequent transmission when a check point occurs.

The duration of the time the state data is accumulated until a check point occurs is the idle period (e.g., 212-1) preceding the transmission of the state data. In one embodiment, the idle period may be a predetermined regular interval (e.g., 20 ms).

In another example, the idle period is dynamic and is not a regular interval. For example, the state data has a predetermined data amount (e.g., 32 megabytes). If the rate of accumulating state data (or rate of page dirtying) is known (e.g., 1 megabytes/ms), then the time to accumulate the pre-determined data amount is also determined (e.g., 32 ms).

Additionally, the predetermined idle period (e.g., 214-1) may also be determined. The predetermined idle period may be the duration a pre-determined number of RTTs (e.g., 5 RTTs) between primary virtual machine 112 and secondary virtual machine 122.

If it is determined, for example, by a tinier, that the idle period 212-1 prior to transmission of state data 114-1 will exceed pre-determined idle period 214-1, then priming data 218-1 is transmitted during at least a portion of pre-determined idle period 214-1. As a result, the transmission rate is prevented from settling to a lower rate (e.g., from R1 to R0) because the congestion window is not reduced.

However, if it is determined that the idle period 212-1 prior to transmission of state data 114-1 will not exceed pre-determined idle period 214-1, then priming data 218-1 is not transmitted during at least a portion of pre-determined idle period 214-1. Accordingly, the transmission rate is prevented from settling to a lower rate and the state data is able to be transmitted in a low-latency bursty fashion.

It is noted that an idle period, if any, between the priming data and the state data does not exceed the pre-determined idle period. For example, idle periods 220-1, 220-2 and 220-3 also do not exceed the pre-determined idle period. That is, the timing for transmission of the priming data 218 is selected such that an idle period 220 after the transmission of the priming data 218 and before the transmission of the state data does not end up exceeding the pre-determined idle period.

Referring to FIG. 2B, it should be appreciated that the priming data may be transmitted during at least a portion of the pre-determined idle period at any transmission rate, in any wave form, and at any duration to ensure that the transmission rate is prevented from settling to a lower rate (e.g., from R1 to R0) during the transmission of the state data.

Example Methods of Operation

The following discussion sets forth in detail the operation of some example methods of operation of embodiments. With reference to FIGS. 3, 4 and 5, flow diagrams 300, 400, and 500 illustrate example procedures used by various embodiments. Flow diagrams 300, 400, and 500 include some procedures that, in various embodiments, are carried out by a processor under the control of computer-readable and computer-executable instructions. In this fashion, procedures described herein and in conjunction with flow diagrams 300, 400, and 500 are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, solid state drives/"disks," and optical disks, any or all of which may be employed with computer environments and/or cloud environments. The computer-readable and computer-executable instructions, which reside on tangible computer readable storage media, are used to control or operate in conjunction with, for example, one or some combination of processors of the computer environments and/or cloud environment. It is appreciated that the processor(s) may be physical or virtual or some combination (it should also be appreciated that a virtual processor is implemented on physical hardware). Although specific procedures are disclosed in flow diagrams 300, 400, and 500, such procedures are examples. That is, embodiments are well suited to performing various other procedures or variations of the procedures recited in flow diagrams 300, 400, and 500. Likewise, in some embodiments, the procedures in flow diagrams 300, 400, and 500 may be performed in an order different than presented and/or not all of the procedures described in one or more of these flow diagrams may be performed. It is further appreciated that procedures described in flow diagrams 300, 400, and 500 may be implemented in hardware, or a combination of hardware with firmware and/or software.

FIG. 3 depicts a process flow diagram 300 for a method for reducing delay of bursty data transmission in a network employing a congestion control protocol, according to various embodiments.

At 310, data is accessed that is to be periodically transmitted over a network employing a congestion control protocol. The data is to be periodically transmitted with a high burst rate followed by an idle period. An increase in the congestion window progressively increases a data transmission rate during a data transmission rate increase period invoked immediately following a predetermined idle period.

For example, state data 114 is accessed and periodically transmitted over network 130 which employs an SST congestion control protocol. When the SST congestion control protocol is utilized, the congestion window is reduced such that the transmission rate of data progressively increases during a data transmission rate increase period (e.g., data transmission rate increase period 216-1) invoked immediately following a predetermined idle period (e.g., predetermined idle period 214-1).

At 320, prior to transmitting the data, priming data is transmitted during at least a portion of the idle period until the congestion control protocol progressively increases the data transmission rate to a desired transmission rate. For example, priming data 218-1 is transmitted during at least a portion of idle period 212-1 until the congestion window of the SST congestion control protocol progressively increases the data transmission rate to a desired transmission rate (e.g., R1).

At 330, in response to realization of a predetermined data transmission rate, the data is transmitted over the network. For example, state data 114-1 is transmitted over network 130 responsive to the transmission data rate of the network reaches a predetermined data transmission rate (e.g., R1).

At 340, in response to completion of the data transmission rate increase period, transmitting the data. For example, state data 114-3 is transmitted over network 130 responsive to the completion of priming data 218-3 transmitted during data transmission rate increase period 216-3.

At 350, the data is transmitted to a secondary virtual machine. For example, state data 114 is transmitted over network 130 to secondary virtual machine 122. Host 110 and host 120 are independent hosts. As such, primary virtual machine 112 and secondary virtual machine 122 are also independent of one another.

At 360, state data of a primary virtual machine is periodically accessed. For example, the memory state of the primary virtual machine is periodically accessed and stored in dirty pages for subsequent transmission to secondary virtual machine 122.

It is noted that any of the procedures, stated above, regarding flow diagram 300 may be implemented in hardware, or a combination of hardware with firmware and/or software. For example, any of the procedures are implemented by a processor(s) of a cloud environment and/or a computing environment.

FIG. 4 depicts a process flow diagram 400 for a method for reducing delay of bursty data transmission in a network employing a congestion control protocol, according to various embodiments.

At 410, state data of a primary virtual machine is accessed that is to be periodically transmitted over a network employing a congestion control protocol. An increase in the congestion window progressively increases data transmission rates during a data transmission rate increase period invoked immediately following a predetermined idle period. The state data is to be periodically transmitted with a high burst rate followed by an idle period.

For example, network 130 (a TCP/IP network) employs an SST congestion control protocol. Moreover, state data 114 is periodically accessed from primary virtual machine 112 for periodic transmission to secondary virtual machine 122.

At 420, prior to transmitting the state data of the primary virtual machine over the network, priming data is transmitted during at least a portion of the idle period until the data transmission rate progressively increases to a desired transmission rate via the opening of the congestion window. For example, an increase in the congestion enables the transmission rate of data to progressively increase during a data transmission rate increase period (e.g., data transmission rate increase period 216-1). In particular, priming data 218-1 is transmitted during at least a portion of idle period 212-1 until the data transmission rate is at a desired transmission rate (e.g., R1) via the opening of the congestion window.

At 430, the state data is periodically transmitted to a secondary virtual machine over the network at the desired transmission rate. State data 114 is periodically transmitted over network 130 to secondary virtual machine 122.

It is noted that any of the procedures, stated above, regarding flow diagram 400 may be implemented in hardware, or a combination of hardware with firmware and/or software. For example, any of the procedures are implemented by a processor(s) of a cloud environment and/or a computing environment.

FIG. 5 depicts a process flow diagram 500 for a method for preventing settling of a transmission rate to a reduced value, according to various embodiments.

At 510, data is accessed that is to be periodically transmitted over a network employing a congestion control protocol comprising a predetermined idle period, wherein the data is to be periodically transmitted with a high burst rate, wherein transmission of the data is preceded by an idle period.

For example, referring now to FIG. 2B, state data (e.g., memory state) of the primary virtual machine (e.g., state data 114-1) is accumulated in dirty pages for subsequent transmission over network 130. Transmission of the state data is preceded by an idle period, such as idle period 212-1 and transmitted with a high burst rate over the network. Moreover, network includes a congestion control protocol that, when invoked, limits the transmission rate of the memory state.

At 520, it is determined if the idle period preceding transmission of the data will exceed the predetermined idle period of the congestion control protocol. For example, the progression of the accumulation of the state data is monitored. The duration to accumulate the requisite state data (e.g., idle period 212-1) may be extrapolated from the data accumulation rate. Accordingly, it is determined if the period of accumulating the requisite state data will exceed the predetermined idle period (e.g., predetermined idle period 214-1).

At 530, priming data is transmitted during at least a portion of the predetermined idle period to prevent settling of a transmission rate of the network to a reduced value. For example, still referring to FIG. 2B, priming data 218-1 is transmitted during at least a portion of the predetermined idle period 214-1 such that the congestion window is not reduced and the transmission rate of the network will not settle to a reduced value.

At 540, the state data is transmitted over the network. For example, state data 114-1 is transmitted in a low-latency bursty fashion over network 130 because the transmission rate of the network was prevented from settling to a reduced value.

It is noted that any of the procedures, stated above, regarding flow diagram 500 may be implemented in hardware, or a combination of hardware with firmware and/or software. For example, any of the procedures are implemented by a processor(s) of a cloud environment and/or a computing environment.

It should also be recognized that the techniques described herein are also applicable to hosted virtualized computer systems. Furthermore, although benefits that are achieved may be different, the techniques described herein may be applied to certain non-virtualized computer systems.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

The invention claimed is:

1. A computer-implemented method comprising:
receiving low-latency data, the low-latency data is configured to be transmitted over a network link employing a transport layer congestion control protocol;
determining a window threshold period based on the transport layer congestion control protocol, the window threshold period representing a length of time before a congestion window of the transport layer congestion control protocol begins to decrease in size based on a lack of data transmissions during the length of time;
detecting an idle period between transmissions of bursts of low-latency data; and
transmitting priming data only when the idle period between the transmissions of the bursts of the low-latency data is to exceed the window threshold period, the priming data being transmitted such that the congestion window progressively increases in size or is prevented from decreasing in size.

2. The computer-implemented method of claim 1 wherein the transport layer link is a transmission control protocol link.

3. The computer-implemented method of claim 1, further comprising transmitting a burst of the low-latency data over the network link after the idle period.

4. The computer-implemented method of claim 3, wherein transmitting the burst of the low-latency data further comprises:
transmitting the burst of the low-latency data to a secondary virtual machine.

5. The computer-implemented method of claim 3, wherein transmitting the burst of low-latency data is based on a symmetric multiprocessing systems fault tolerance (SMP-FT) protocol.

6. The computer-implemented method of claim 1, wherein receiving the low-latency data further comprises:
   periodically receiving state data of a primary virtual machine.

7. The computer-implemented method of claim 6, wherein the primary virtual machine is hosted on a first host computing system and a secondary virtual machine is hosted on a second host computing system.

8. The computer-implemented method of claim 1, further comprising transmitting a burst of the low-latency data over the network link when a quantity of the low-latency data received has exceeded a threshold quantity.

9. The computer-implemented method of claim 1, wherein the transport layer congestion control protocol is a Slow-Start Threshold (SST) congestion control protocol.

10. The computer-implemented method of claim 1, wherein a length of the window threshold period is based on a predetermined number of round trip times (RTTs).

11. The computer-implemented method of claim 1, wherein the low-latency data comprises a plurality of data packets, wherein each data packet is 1400 bytes.

12. A non-transitory computer-readable storage medium having instructions embodied therein that, when executed, cause a computer system to perform a method comprising:
   receiving state data of a primary virtual machine to be transmitted over a network link employing a transport layer congestion control protocol, said state data comprising information defining a state of the primary virtual machine;
   determining a window threshold period based on the transport layer congestion control protocol, the window threshold period representing a length of time before a congestion window of the congestion control protocol begins to decrease in size based on a lack of data transmissions during the length of time;
   detecting an idle period between transmissions of bursts of the state data; and
   injecting priming data in the network link only when the idle period between the transmissions of the bursts of the state data is to exceed the window threshold period, the priming data being injected in the network link such that the congestion window progressively increases in size or is prevented from decreasing in size.

13. The non-transitory computer-readable storage medium of claim 12, wherein the state data is received via a symmetric multiprocessing systems fault tolerance (SMP-FT) protocol.

14. The non-transitory computer-readable storage medium of claim 12, wherein the priming data is not transmitted when the state data is transmitted.

15. The non-transitory computer-readable storage medium of claim 12, wherein the instructions further cause the computer system to perform the method that further comprises transmitting a burst of the state data to a secondary virtual machine over the network link when a quantity of the low-latency data received has exceeded a threshold quantity.

16. The non-transitory computer-readable storage medium of claim 12, wherein the primary virtual machine is hosted on a first host computing system and a secondary virtual machine is hosted on a second host computing system.

17. The non-transitory computer-readable storage medium of claim 12, wherein the network link is a TCP/IP link.

18. The non-transitory computer-readable storage medium of claim 12, wherein the transport layer congestion control protocol is a Slow-Start Threshold (SST) congestion control protocol.

19. The non-transitory computer-readable storage medium of claim 12, wherein the threshold window is a predetermined number of round trip times (RTTs).

20. The non-transitory computer-readable storage medium of claim 12, wherein the state data comprises a plurality of data packets, wherein each data packet is 1400 bytes.

21. A system comprising:
   one or more processors; and
   a memory comprising computer-executable instructions that cause the one or more processors to performed the following operations:
      receiving low-latency data, the low-latency data is configured to be transmitted over a network link employing a transport layer congestion control protocol;
      determining a window threshold period the transport layer congestion control protocol, the window threshold representing a length of time before a congestion window of the transport layer congestion control protocol begins to decrease in size based on a lack of data transmissions during the length of time;
      detecting an idle period between transmissions of bursts of low-latency data; and
      transmitting priming data only when the idle period between the transmissions of the bursts of the low-latency data is to exceed the window threshold period, the priming data being transmitted such that the congestion window progressively increases in size or is prevented from decreasing in size.

22. The system of claim 21, wherein the network link is a TCP/IP link.

23. The system of claim 21, wherein the transport layer congestion control protocol is a Slow-Start Threshold (SST) congestion control protocol.

24. The system of claim 21, wherein the idle period is a predetermined number of round trip times (RTTs).

* * * * *